(12) United States Patent
Britton et al.

(10) Patent No.: US 8,434,704 B2
(45) Date of Patent: May 7, 2013

(54) METHOD OF PRODUCING STABLE OXYGEN TERMINATED SEMICONDUCTING NANOPARTICLES

(75) Inventors: David Thomas Britton, Cape Town (ZA); Margit Harting, Mowbray (ZA)

(73) Assignee: PST Sensors (Proprietary) Limited, Cape Town (ZA)

( * ) Notice: Subject to any disclaimer, the term of this patent is extended or adjusted under 35 U.S.C. 154(b) by 159 days.

(21) Appl. No.: 12/991,879

(22) PCT Filed: Apr. 9, 2009

(86) PCT No.: PCT/IB2009/051507
§ 371 (c)(1), (2), (4) Date: Dec. 22, 2010

(87) PCT Pub. No.: WO2009/125370
PCT Pub. Date: Oct. 15, 2009

(65) Prior Publication Data
US 2012/0018551 A1    Jan. 26, 2012

(30) Foreign Application Priority Data
Apr. 9, 2008 (ZA) .................................. 2008/02727

(51) Int. Cl.
*B02C 1/00* (2006.01)
*B02C 23/18* (2006.01)
*B02C 21/00* (2006.01)

(52) U.S. Cl.
USPC .................... 241/15; 241/22; 241/23; 241/21

(58) Field of Classification Search ..................... 241/15, 241/21, 22, 23
See application file for complete search history.

(56) References Cited

U.S. PATENT DOCUMENTS
2003/0059361 A1    3/2003    Carberry

FOREIGN PATENT DOCUMENTS
EP    0960655 A    12/1999
WO    WO 2007/004014 A    1/2007

OTHER PUBLICATIONS

Araujo-Andrade, C. et al.: "Synthesis of nanocrystalline Si particles from a solid-state reaction during a ball-milling process", Scripta Materialia 49 (2003) pp. 773-778.

*Primary Examiner* — Faye Francis
(74) *Attorney, Agent, or Firm* — Frommer Lawrence & Haug LLP; Ronald R. Santucci

(57) ABSTRACT

A method and apparatus of producing inorganic semiconducting nanoparticles having a stable surface includes providing an inorganic bulk semiconductor material milled in the presence of a selected reducing agent. The reducing agent acts to chemically reduce oxides of the semiconductor material, or prevent the formation of such oxides to provide semiconducting nanoparticles having a stable surface, allowing electrical contact between the nanoparticles. The milling media and/or one or more components of the mill include the selected reducing agent. The milling media or mill are typically composed of a metal selected from the group comprising iron, chromium, cobalt, nickel, tin, titanium, tungsten, vanadium, and aluminum, or an alloy containing one or more of these metals. Alternatively, the selected reducing agent includes a liquid contained in the mill during milling, which is typically an acidic solution containing any of hydrochloric, sulphuric, nitric, acetic, formic, or carbonic acid, or a mixture thereof.

10 Claims, 4 Drawing Sheets

METHOD OF PRODUCING STABLE OXYGEN TERMINATED SEMICONDUCTING NANOPARTICLES

This application is a 371 of PCT/IB2009/051507 filed on Apr. 9, 2009, published on Oct. 15, 2009 under publication number WO 2009/125370 A.

BACKGROUND OF THE INVENTION

THIS invention relates to a method of producing inorganic semiconducting nanoparticles having a stable surface.

Semiconductor nanoparticles, with a characteristic size of a few nanometres up to several hundred nanometres, are a widely studied type of material, in which size effects dominate over properties of the bulk material. Depending on the application, single particles may be dispersed randomly in a matrix (quantum dots, OLEDs. DSC cells, organic semiconducting inks); regularly arranged (photonic arrays); or form an interconnecting structure (inorganic semiconducting inks). The latter may be a close packed structure, random network or a fractal agglomeration of different sized clusters.

In basic scientific studies a stable, well characterised surface is required, which has led to nanotechnology being seen as an expensive, high technology option, with complex synthesis and handling techniques. Bare, undecorated silicon surfaces are only stable under ultra high vacuum conditions. Many nanoparticles produced by wet chemical synthesis, e.g. silicon nanoparticles such as those described by Baldwin et al (Chemical Communications 1822 (2002)) are terminated with long alkyl chains, which act as a surfactant to prevent aggregation and the growth of larger particles.

On bulk silicon surfaces thermal oxides may be tens or even hundreds of microns thick, and depending on temperature and humidity, the native oxide normally grows to a thickness of 5-10 nm. A layer this thick would obviously insulate any nanoparticle and dominate its electrical properties.

In a previous patent application of the present applicants (WO 2007/004014) the described invention exploited the observation that, after the particles have been produced, oxidation is self limiting, at one monolayer or less, and forms a stable surface, so that electrical conduction can occur unhindered between interconnecting particles.

It is an object of the invention to provide an alternative method of producing semiconducting nanoparticles from bulk material.

SUMMARY OF THE INVENTION

According to a first aspect of the invention there is provided a method of producing inorganic semiconducting nanoparticles having a stable surface, the method comprising:
providing an inorganic bulk semiconductor material; and
milling the bulk semiconductor material in the presence of a selected reducing agent, the reducing agent acting to chemically reduce oxides of one or more component elements of the semiconductor material, or prevent the formation of such oxides by being preferentially oxidised,
thereby to provide semiconducting nanoparticles having a stable surface which allows electrical contact between the nanoparticles.

The surfaces of the nanoparticles may be terminated with a monolayer sub-stoichiometric oxide or individual oxygen, hydrogen and hydroxyl groups which terminate active sites.

A stable stoichiometric oxide of one or more component elements of the semiconductor material may be reduced, or prevented from forming, by a preferential chemical reaction.

Alternatively, an intermediate sub-stoichiometric oxide of one or more component elements of the semiconductor material may be reduced, or prevented from forming, by a preferential chemical reaction, thus hindering the formation of the final stable stoichiometric phase of the oxide.

The preferential chemical reaction may be promoted by carrying out the milling at a temperature above room temperature and below the melting, or decomposition, temperature of the inorganic bulk semiconductor material.

Preferably, the milling is carried out at a temperature between 100° C. and 200° C.

In another embodiment, the milling media and/or one or more components of the mill may comprise the reducing agent.

For example, the milling media or mill may be composed of a metal selected from the group comprising iron, chromium, cobalt, nickel, tin, titanium, tungsten, vanadium, and aluminium, or an alloy containing one or more of said metals.

The milling media or mill may comprise hard steel or stainless steel alloys, or a titanium alloy, for example.

The method may be carried out using a high energy mill with a hammer action, such as a disc mill or similar, in which a pestle of the mill, a mortar of the mill, or both are composed of the selected reducing agent.

Alternatively, the method may be carried out using a low energy, stirred media mill, such as a ball mill, a rod mill or similar, in which the milling media, a lining of the mill, or both are composed of the selected reducing agent.

The selected reducing agent may, in another embodiment, comprise a liquid contained in the mill during milling of the bulk semiconductor material.

For example, the selected reducing agent may be an acidic solution containing any of hydrochloric, sulphuric, nitric, acetic, formic, or carbonic acid, or a mixture thereof.

The method may include maintaining the temperature of the milled bulk semiconductor material below 100° C. during milling thereof.

Preferably, the method includes maintaining the temperature of the milled bulk semiconductor material below 50° C. during milling thereof.

The inorganic bulk semiconductor material may be a group IV element such as silicon or germanium.

Alternatively the inorganic bulk semiconductor material may be a compound or alloy containing elements from the groups II, III, IV, V, and VI, excluding semiconducting oxides.

For example, the compound or alloy may comprise GaAs, InSb, CdTe, PbS, or $Cu_xIn_{1-x}Se$.

According to a further aspect of the invention there is provided apparatus for producing inorganic semiconducting nanoparticles having a stable surface, the apparatus comprising a mill including milling media and/or one or more components which comprise a selected reducing agent, the reducing agent acting to chemically reduce oxides of one or more component elements of an inorganic bulk semiconductor material when milled, or prevent the formation of such oxides by being preferentially oxidised, thereby to provide semiconducting nanoparticles having a stable surface which allows electrical contact between the nanoparticles.

The selected reducing agent may be a metal selected from the group comprising iron, chromium, cobalt, nickel, tin, titanium, tungsten, vanadium, and aluminium, or an alloy containing one or more of said metals.

The selected reducing agent may comprise hard steel, a stainless steel alloy, or a titanium alloy.

DESCRIPTION OF EMBODIMENTS

Figure 1:
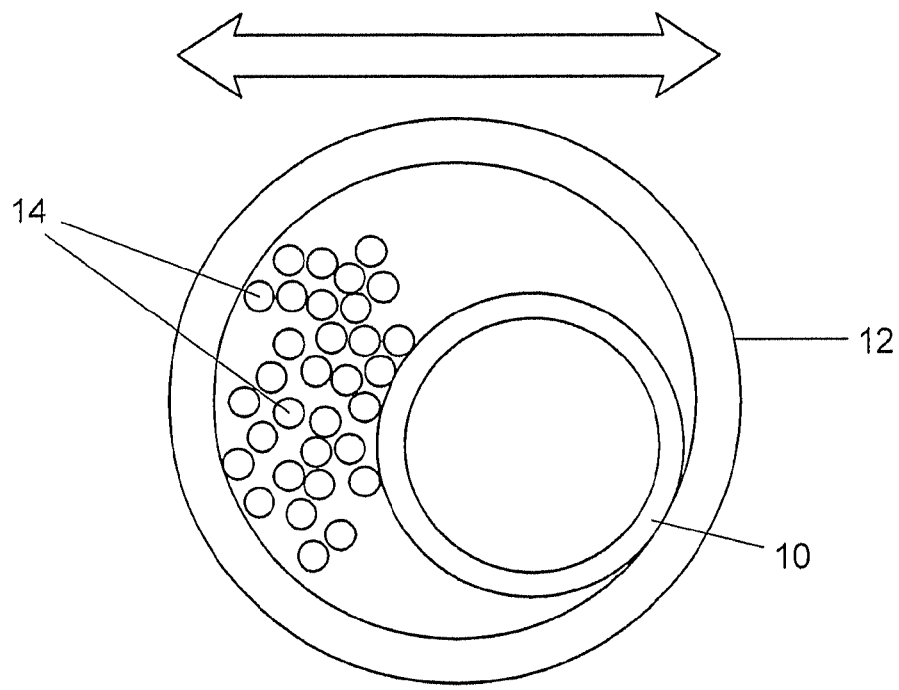
FIG. 1 is a schematic illustration of the operation of a laboratory disc mill or orbital pulveriser used in the method of the invention.

The invention concerns the production of semiconducting nanoparticles for electronic and electrical applications in general, and specifically in those applications where semiconducting properties are required. The nanoparticles preferably comprise intrinsic or doped silicon, although other elemental or compound semiconductor materials, including amongst others Ge, GaAs, AlGaAs, GaN, InP, SiC, and SiGe alloys, may be used. Methods of production of nanoparticles can be classed into two groups, usually described as top-down and bottom-up. The latter describes synthesis methods, and it is known that such methods can produce nanoparticles with the desired properties if oxygen, in any form, is excluded from participating in the reaction. On the basis of this criterion alone, most wet chemical synthesis methods are unsuitable, but a suitable method of production, which is known, is the pyrolisis of silane gas.

Top-down approaches refer, in the main, to mechanical attrition or milling. Published methods of milling nanoparticles specify the use of low energy ball milling using ceramic milling media. The particles so produced are invariably heavily oxidised, and require further processing to remove the oxide coating and stabilise the surface. One notable exception is the reactive milling of nanostructured, porous silica in the presence of aluminium (C. Araujo-Andrade et al, *Scr. Mater.* 49, 773 (2003)) or carbon particles (C. Lam et al, J. Cryst. Growth 220, 466-470 (2000)). However, in the case of aluminium, further processing is required to separate the resulting silicon and alumina nanoparticles.

The present invention provides a method of producing inorganic semiconducting nanoparticles by mechanical milling of a bulk material in an environment where there is a selected reducing agent or component. The reducing agent or component removes an oxide layer on the surface of the particles as it is formed, or prevents free oxygen and other oxidising agents from reacting with the semiconducting particle surface. The latter is achieved by removing the oxygen in a preferential reaction. Thus, a stable stoichiometric oxide, or an intermediate sub-stoichiometric oxide, of one or more component elements of the semiconductor material is reduced, or prevented from forming, by a preferential chemical reaction. The oxide which is removed may be the stoichiometric oxide or, preferably, an intermediate sub-stoichiometric phase. In atmospheric milling methods according to the invention, the reactive components are composed of the milling media and lining of the mill, which should preferentially be hard metal alloys. Alternatively, the mill liner and milling media may be inert and a reducing medium, in the form of a suitable gaseous atmosphere or, for wet milling, a suitable acid, is used.

In the case of elemental semiconductors, the purpose of the method is to prevent the formation of a thick oxide, or other capping layer, at the surface of the particles so that a stable surface is formed on the particles, which allows electrical contact between the particles. For compound semiconductor alloys, a further aim is to maintain the stoichiometry of the particles, both throughout the particles, and more particularly in the surface region of the particles, by preventing the loss of gaseous oxide of one of the particles' component elements. A particular example would be sulphur dioxide released during the milling of chalcogenide semiconductors.

In addition to the use of a reducing medium in the milling process, other conditions may be applied. These include:

A high attrition rate, so that a small particle size with a high curvature of the surface is achieved before a stoichiometric oxide layer can form on the surface. The disclosure of WO 2007/004014 has shown that, once formed, such particles are stable against oxidation.

A high milling temperature, to overcome the activation energies required for the reduction of the sub-stoichiometric oxide on the particle surface, and the migration of oxygen in the milling medium. This temperature should, however, be kept below the melting, or decomposition, temperature of the semiconducting material.

In a preferred embodiment of the method, all three conditions are used.

Table 1 below shows the formation enthalpies for the oxides of the elements in various semiconducting alloys, alongside those for the oxides of metals which may be used as milling media. Only three metallic elements have stable oxides with formation enthalpies more negative than the stable oxide of silicon, $SiO_2$. These are aluminium, chromium and titanium. Aluminium has been reported for reactive milling of nanostructured silica to produce silicon (C. Araujo-Andrade et al, Scr. Mater. 49, 773 (2003)) but is generally considered too soft for the milling of bulk silicon. Chromium, titanium and their alloys are, however, hard materials and would be suitable for reducing the stable oxides of all group IV semiconductors as well as III-V and II-VI semiconducting alloys, such as GaAs and InSb.

TABLE 1

Heats of Formation for the oxides of elements in various semiconducting alloys and for the oxides of the reducing agents (values taken from the CRC Handbook of Chemistry and Physics, CRC Press) in kg Cal/mol

| Semi-conductor Material Oxides | Enthalpy of formation | Reducing Agent Oxide | Enthalpy of formation | Comment |
|---|---|---|---|---|
| SiO | −21 | | | Intermediate |
| $SiO_2$ | −210 | | | All phases 207-219 |

TABLE 1-continued

Heats of Formation for the oxides of elements in various semiconducting alloys and for the oxides of the reducing agents (values taken from the CRC Handbook of Chemistry and Physics, CRC Press) in kg Cal/mol

| Semi-conductor Material Oxides | Enthalpy of formation | Reducing Agent Oxide | Enthalpy of formation | Comment |
|---|---|---|---|---|
| GeO | −61 | | | Intermediate |
| $GeO_2$ | −127 | | | |
| $Ga_2O$ | −81 | | | |
| $Ga_2O_3$ | −256 | | | |
| $As_2O_3$ | −155 | | | All phases 152-156 |
| $Sb_2O_3$ | −169 | | | Both phases 168-169 |
| $In_2O_3$ | −220 | | | |
| CdO | −62 | | | |
| TeO | +43 | | | Intermediate will not form |
| PbO | −53 | | | |
| $SO_2$ | −71 | | | |
| CO | −25 | | | |
| $CO_2$ | −94 | | | |
| SeO | +10 | | | Intermediate will not form |
| | | $Al_2O$ | −32 | Blocks SiO, CO |
| | | $Al_2O_3$ | −404 | Most stable oxide |
| | | $Cr_2O_3$ | −275 | Blocks/reduces all oxides |
| | | $CrO_2$ | −142 | Blocks all intermediate oxides |
| | | CoO | −57 | Blocks SiO |
| | | FeO | −65 | Blocks Si, Ge, C |
| | | $MoO_2$ | −132 | Blocks all intermediates |
| | | NiO | −57 | Blocks Si, C |
| | | SnO | −69 | |
| | | TiO | −125 | Blocks all intermediate oxides. Formation of $TiO_2$ will reduce $SiO_2$ |
| | | $WO_2$ | −137 | Blocks all intermediate oxides |
| | | VO | −101 | |

Other metals which will reduce the intermediate sub-stoichiometric oxides of silicon, germanium, and component elements of inorganic semiconducting alloys are iron, nickel, cobalt, tin, molybdenum, tungsten, and vanadium. Preferably, these elements will be combined in an alloy to form the milling media or body of the mill, but they may be used in their elemental form. Examples of suitable alloys are iron-cobalt based hard-steels, iron-nickel and iron-chromium based stainless steels, and titanium-aluminium-vanadium based alloys.

A preferred embodiment of apparatus for carrying out the method of the invention is shown in the schematic diagram of FIG. 1, which shows the main components of a disc mill, also known as an orbital pulverizer. The mill comprises a pestle 10 movable within a mortar 12. Lateral movement of a base plate of the mill, indicated by the arrows, causes a hammer action of the pestle 10 against the mortar 12, thereby crushing bulk material 14 within the mortar into powder and, ultimately, into nanoparticles. Suitable mills of this design, available commercially, are the Siebtechnik T750 and the Retsch RS200.

In accordance with one aspect of the invention the pestle, the mortar, or both are constructed of a hard metal which reduces the oxide forming at the surface of the nanoparticles. For example, the pestle and/or mortar can be constructed of a suitable alloy, such as 304 stainless steel, 51200 chrome steel, nichrome, or Ti6Al4V. Both stainless steel and hard steel alloy components are provided by the manufacturers, to be used in milling minerals, solely because of their hardness. For the milling of soft minerals, agate milling media are recommended, whereas for the milling of hard materials, such as silicon, zirconia is recommended.

Under normal operation of the mill, micron-sized particles are obtained from bulk material after several tens of seconds of milling time. As an example, quartz (silicon dioxide) and other minerals are typically milled to fine powders, for analytical purposes, for a period of 30 s, during which time the temperature remains near room temperature.

Nanoparticles as described above, with a mean size of approximately 100 nm, can be obtained through extended milling for total periods between one and five hours. Furthermore, in such a process, a desired temperature range of operation between 100 and 200° C. can be maintained by a combination of different periods of milling and cooling. Mills of different construction with a similar hammer action are known, and, with the same modification of materials and procedure can be used substantially as described above to carry out the method of the invention. In this embodiment all three desirable conditions: a reducing medium; high attrition rate; and elevated temperature, are obtained.

In a second embodiment, a mill as described in the first embodiment above is used for wet milling of particles, using a weak acidic solution. The pestle and mortar may, in this case, be manufactured from any hard material, such as ceramics, but the metals described in the first embodiment are preferred. Preferred acidic liquids include aqueous solutions of: hydrochloric, sulphuric, nitric, formic, acetic and carbonic acids, and mixtures thereof. In this embodiment, both the attrition rate and temperature are low, and the main action in reducing the oxide is provided by the liquid medium. The attrition rate is probably up to 10 times slower than dry milling, and the temperature less than 100° C., preferably less than 50° C. Correct buffering of the acidity of the solution may, however, be used to transfer the oxygen through a chemical reaction with the surface of the pestle or mortar, should they be constructed of the materials envisaged here.

In a third preferred embodiment, in a stirred media mill, such as a ball mill or rod mill, the respective milling media are fabricated from the same metals and alloys as in the first embodiment. The lining of the mill may also be constructed of the same material. The design and operation of such mills is well-known, with the only difference being the choice of milling media to enable the production of nanoparticles as described above. In this embodiment, the conditions of a high attrition rate and elevated temperature are not necessarily obtained.

In a fourth embodiment, a mill as described in the third embodiment is used for wet milling of particles, using a weak acidic solution. The milling media may, in this case, be manufactured from any hard material, such as ceramics, but the metals described in the first embodiment are preferred. Preferred acidic liquids include aqueous solutions of: hydrochloric, sulphuric, nitric, formic, acetic and carbonic acids, and mixtures thereof. In this embodiment, both the attrition rate and temperature are low, and the main action in reducing the oxide is provided by the liquid medium.

Example 1

The methods as envisaged in the first two embodiments have been applied using 51200 chrome steel milling media. As a reference material, a bulk material comprising 2503 grade silicon metal was dry milled, at room temperature, for extended periods in a laboratory ball mill with a neoprene drum, using zirconia balls as the milling media. Following established procedures, as the particle size was reduced, the size of the zirconia balls was reduced from 15 mm diameter, through 10 mm, to 5 mm.

In accordance with the first embodiment of the method, 2503 grade silicon metal was milled, in air, for periods up to five hours, in 30 minute intervals in a laboratory disc mill equipped with a 51200 chrome steel pestle and mortar. The temperature range was maintained between 100 and 160° C.

In accordance with the second embodiment, the same ball mill as used for milling the reference material was used to mill 2503 grade silicon metal, but using 15 mm diameter chrome steel balls as the milling media.

The surface oxygen concentration in the milled nanoparticles was determined, after several months storage in air, using X-ray photo-electron spectroscopy. This technique has the dual advantage of probing only the first few monolayers of material at the surface of the particle, and being able to distinguish silicon-oxygen chemical bonds, from the oxygen in adsorbed oxygen molecules such as water, carbon dioxide and atmospheric oxygen.

Figure 2:
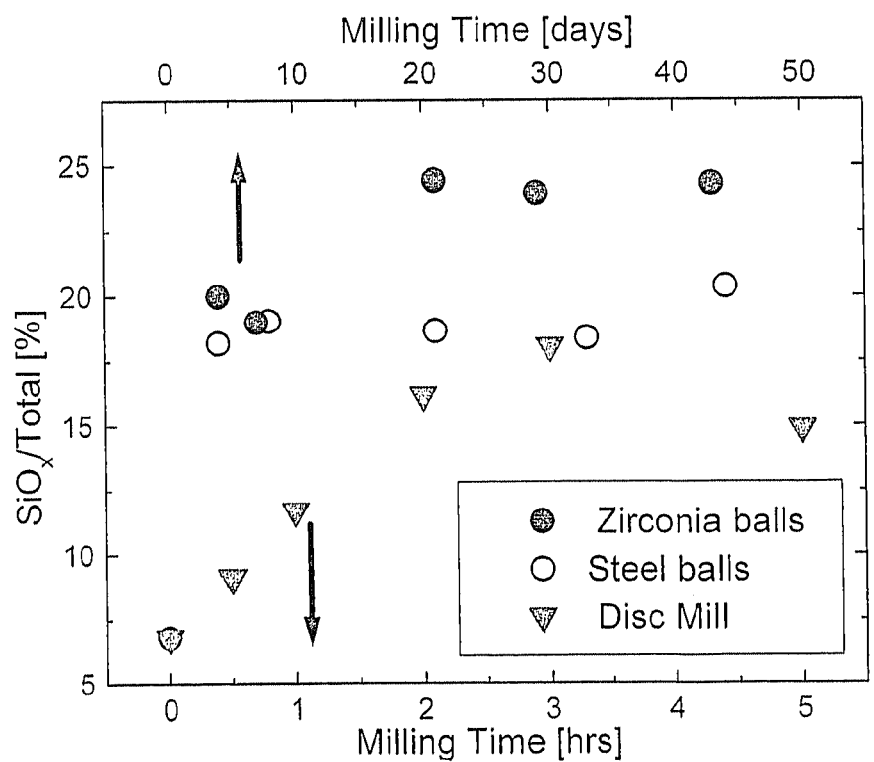
FIG. 2 is a graph showing the fraction of silicon-oxygen bonds in silicon nanoparticles produced according to an embodiment of the method of the invention, by low energy ball milling using zirconia and chrome steel media, and by high energy milling using chrome steel pestle and mortar.

FIG. 2 shows the relative fraction of silicon-oxygen bonds, determined from this measurement, for: the reference material, which has been ball-milled with conventional zirconia balls on the one hand; and with chrome steel balls, and using the disc mill with chrome steel components on the other hand. The milling times are given, on the upper axis, in days for the ball mill, and on the lower axis, in hours for the high energy disc mill. The beneficial effect of using a reducing milling medium is clearly shown by the difference in the concentration of silicon-oxygen bonds between the two materials produced in the ball mill, under otherwise identical conditions. Further reduction in the oxide is seen by the application of the high attrition rate and high temperature regime.

Figure 3:
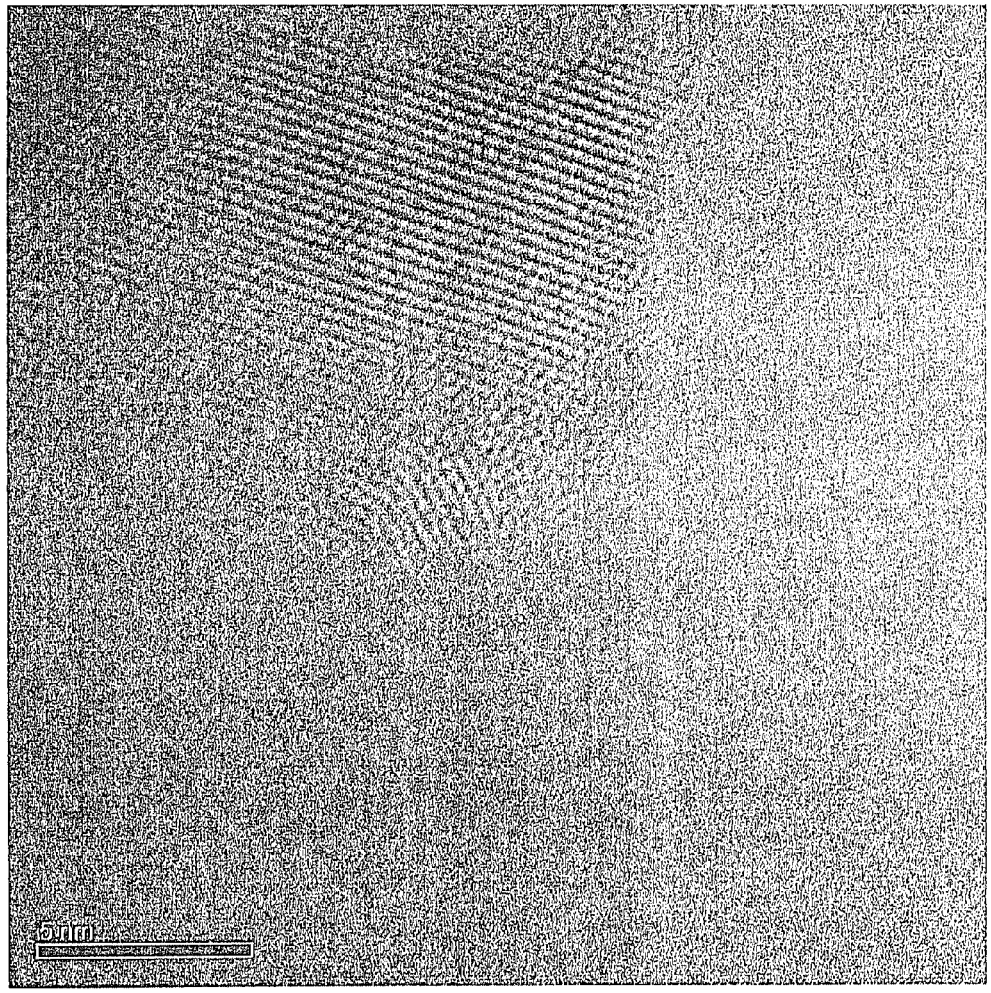
FIG. 3 is a high resolution transmission electron micrograph, showing the surface of a silicon nanoparticle produced by high energy milling, according to one embodiment of the method of the invention.
Figure 4:
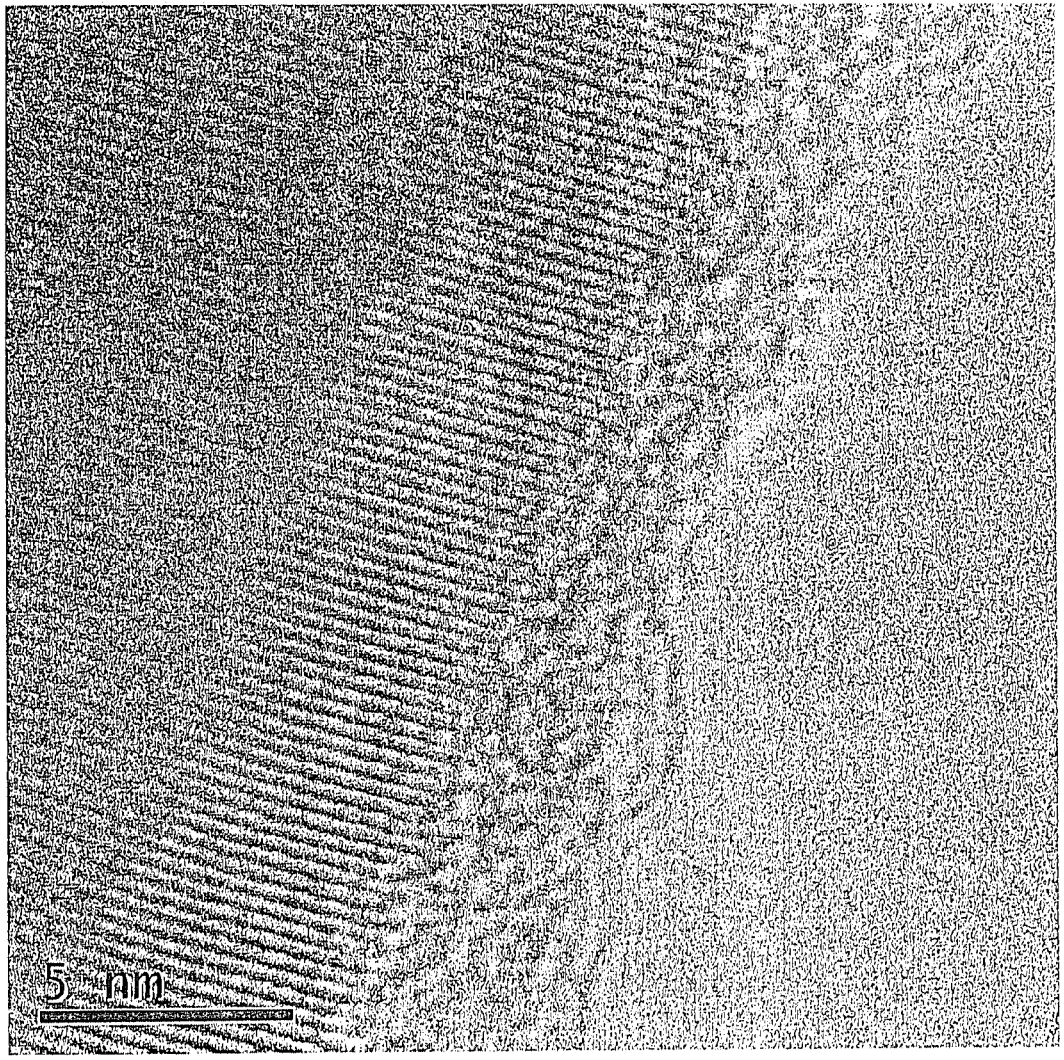
FIG. 4 is a high resolution transmission electron micrograph, showing the surface of a silicon nanoparticle produced by conventional low energy ball milling with zirconia balls.

FIG. 3 is a high resolution transmission electron micrograph of a nanoparticle produced in accordance with the first embodiment of the invention, and FIG. 4 is a corresponding micrograph of a prior art nanoparticle produced from the reference material, milled for 27 days with zirconia balls. In the micrograph of FIG. 3, it is not possible to observe the presence of a surface layer with a different structure or composition to the bulk of the nanoparticle. Indeed the imaged lattice planes clearly extend to the surface of the particle. We can therefore conclude that if this particle is oxidised, then the surface oxide is sub-stoichiometric, and thinner than can be resolved with this imaging technique. In contrast, on the particle from the reference material shown in FIG. 4, there is a clearly defined surface layer, between 2 and 5 nanometres thick, which is seen to have a different composition and a disordered structure.

It can be concluded that the surfaces of the nanoparticles formed by the methods of the invention are terminated with a monolayer sub-stoichiometric oxide or individual oxygen, hydrogen and hydroxyl groups which terminate active sites.

Figure 5:
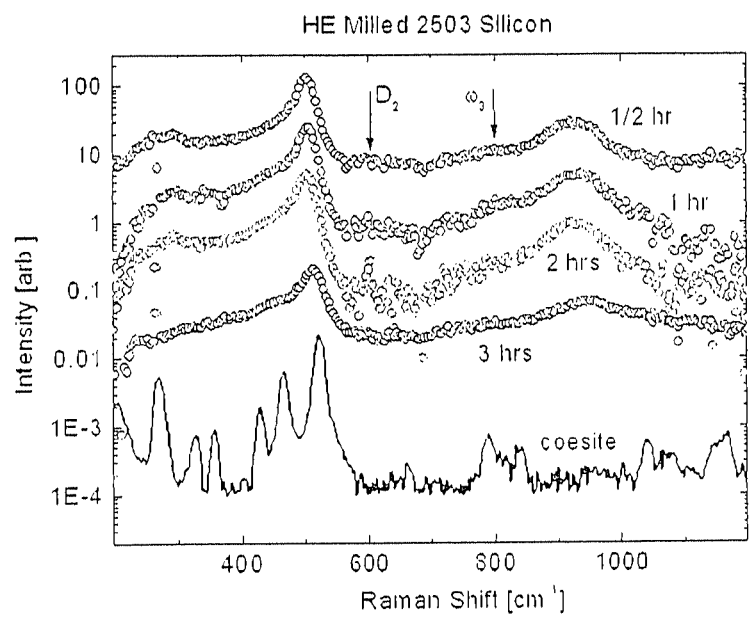
FIG. 5 is a graph showing the Raman spectrum of silicon nanoparticles milled according to the method of the invention for different milling times, showing the reduction in intensity of the oxide phases during milling.
Figure 6:
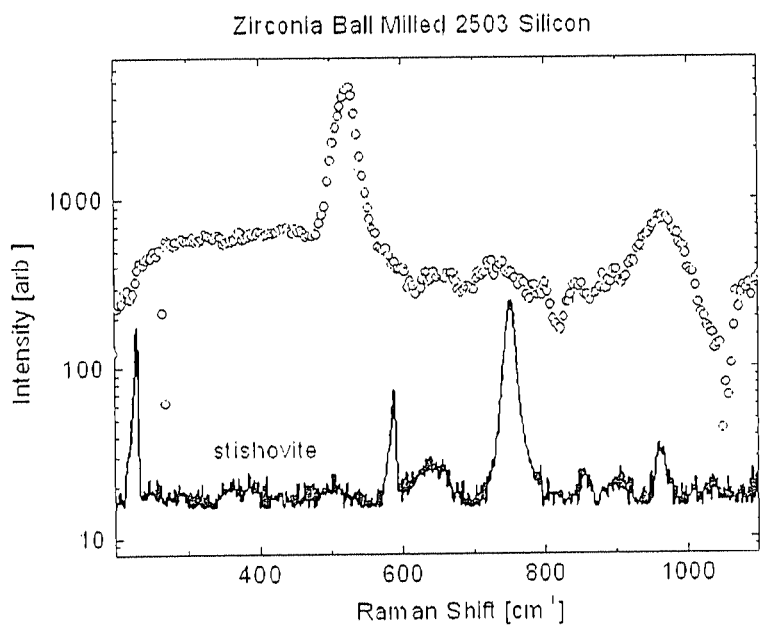
FIG. 6 is a graph showing the Raman spectrum of silicon nanoparticles produced by conventional ball milling with zirconia balls, showing a component corresponding to the stishovite phase of silicon dioxide.

The nature of the surface layer was further investigated by Raman spectroscopy, using an excitation wavelength of 532 nm. For the nanoparticles milled according to the first embodiment of the invention, the Raman spectrum shown in FIG. 5 initially exhibits characteristic peaks attributable to known phases of crystalline (quartz or coesite) and amorphous silicon dioxide, but these were observed to decrease in intensity with milling time. These peaks could no longer be resolved in spectra from particles milled for three hours or longer. In contrast, for the nanoparticles produced by ball milling with zirconia balls, although there was a reduction in the intensity of the peaks corresponding to the original oxide, new Raman scattering peaks corresponding to the stishovite phase of silicon dioxide developed during the milling as shown in FIG. 6.

Thus, the method of the invention makes possible the production of stable silicon nanoparticles with semiconducting functionality for use in electronic and electrical applications in general, and specifically in those applications where semiconducting properties are required.

The invention claimed is:

1. A method of producing inorganic semiconducting nanoparticles having a stable surface, the method comprising:
providing an inorganic bulk semiconductor material; and
milling the bulk semiconductor material at a temperature of between 100° C. and 200° C. in the presence of a selected reducing agent, the reducing agent acting to chemically reduce oxides of one or more component elements of the semiconductor material formed during the milling, or prevent the formation of such oxides by being preferentially oxidised,
thereby to produce semiconducting nanoparticles of the inorganic bulk semiconductor material, said nanoparticles having a stable surface which allows electrical contact between the nanoparticles,
wherein the milling media and/or one or more components of the mill comprise the selected reducing agent, said selected reducing agent being a metal selected from the group consisting of iron, chromium, cobalt, nickel, tin, titanium, tungsten, vanadium, aluminium, and an alloy containing one or more of said metals.

2. The method of claim 1 wherein the surfaces of the nanoparticles are terminated with a monolayer sub-stoichiometric oxide or individual oxygen, hydrogen and hydroxyl groups which terminate active sites.

3. The method of claim 1 wherein a stable stoichiometric oxide of one or more component elements of the semiconductor material is reduced, or prevented from forming, by a preferential chemical reaction, to hinder the formation of the final stable stoichiometric phase of the oxide.

4. The method of claim 1 wherein the milling media or mill comprise an element selected from the group consisting of a hard steel, a stainless steel alloy, and a titanium alloy.

5. The method claim 1 wherein the bulk semiconductor material is milled using a high energy mill with a hammer action in which a pestle of the mill, a mortar of the mill, or both are composed of the selected reducing agent.

6. The method of claim 1 wherein the bulk semiconductor material is milled using a low energy, stirred media mill, in which the milling media, a lining of the mill, or both are composed of the selected reducing agent.

7. The method of claim 1 including maintaining the temperature of the milled bulk semiconductor material below 100° C. during milling thereof.

8. The method of claim 7 including maintaining the temperature of the milled bulk semiconductor material below 50° C. during milling thereof.

9. The method of claim 1 wherein the inorganic bulk semiconductor material is a group IV element, preferably silicon or germanium.

10. The method of claim 1 wherein the inorganic bulk semiconductor material is a compound or alloy containing elements from the groups II, III, IV, V, and VI, excluding semiconducting oxides, preferably GaAs, InSb, CdTe, PbS, or $Cu_xIn_{1-x}Se$.

* * * * *